United States Patent [19]

De Haai

[11] 4,174,756

[45] Nov. 20, 1979

[54] SELF-PROPELLED DISK HARROW MACHINE

[76] Inventor: Kermit M. De Haai, R.R. 1, Monroe, Iowa 50170

[21] Appl. No.: 892,675

[22] Filed: Apr. 3, 1978

[51] Int. Cl.² .............................................. A01B 9/00
[52] U.S. Cl. ........................................ 172/55; 172/56; 172/114; 172/116; 172/587
[58] Field of Search ........... 172/2, 3, 55, 56, 114–116, 172/120, 449, 587

[56] References Cited

U.S. PATENT DOCUMENTS

| | | | |
|---|---|---|---|
| 1,040,890 | 10/1912 | Cook | 172/55 |
| 1,302,295 | 4/1919 | Botsford | 172/116 |
| 2,675,750 | 4/1954 | Boyer | 172/55 X |
| 3,213,946 | 10/1965 | Carrick | 172/587 X |

FOREIGN PATENT DOCUMENTS

| | | | |
|---|---|---|---|
| 20236 | 5/1930 | Australia | 172/116 |
| 23101 | of 1900 | United Kingdom | 172/55 |

*Primary Examiner*—Paul E. Shapiro
*Attorney, Agent, or Firm*—Henderson & Sturm

[57] ABSTRACT

A self propelled disk harrow having four gangs of disc members attached thereto which are rotated to propel the disk harrow and to thereby till the soil. Wheels are provided for allowing the disk harrow to travel on public roads and to aid in propelling the disk harrow. When the disc members extend too far into the soil or otherwise become ineffective in propelling the disk harrow, such as because of wet or sandy soil, the weight of the disk harrow transfers to the wheels and the wheels tend to primarily propel the disk harrow.

8 Claims, 2 Drawing Figures

SELF-PROPELLED DISK HARROW MACHINE

BACKGROUND OF THE INVENTION

The present invention relates generally to tillage equipment and more particularly to a self-propelled disk harrow apparatus.

Commercially available tillage tools for farming operations tend to be tractor drawn as opposed to being self-propelled. One of the obvious reasons that this is so is because it would be more expensive to make them self-propelled, whereas one tractor can propel a number of different implements, normally one at a time.

A disadvantage of utilizing a tractor to pull a tillage tool such as a disk harrow is that the weight of the tractor tends to compact the soil, and one of the main objectives in the use of a tillage tool such as a disk harrow is to loosen the soil to prepare a good seed-bed. The larger the tractor, the more this compaction factor becomes a problem.

It is also very important when using a tractor drawn disk harrow that the soil not be too wet, otherwise the heavy tractor will sink down into the soil and the disking operation will be a failure.

Commonly, large 4-wheel drive tractors are utilized so that disking operations or the like can be done even when the soil is not at ideal conditions, but, of course, these tractors are extremely expensive and they still have the obvious disadvantage of compacting the soil while the objective is to loosen the soil. These large tractors require large amounts of fuel, but large tractors are indeed necessary when using large implements.

U.S. Pat. No. 12,575 to S. E. Kurtz, issued on 1906, discloses a disk harrow which is self-propelled by rotating the disc members. There is no provision for providing power to the wheels or providing wheels which will prevent the disc members from going into the ground too far. This design has not been a commercial success for the obvious reasons that it would easily become stuck in wet or sandy soil and that it cannot travel on public roads without damaging them.

U.S. Pat. No. 2,601,818 to H. H. Zwemke discloses a tractor drawn disk harrow which includes a mechanism for power rotating the disc members rather than to merely allow them to rotate freely as they are pulled over the ground, as is conventional. The problems associated with this type of a disk harrow are much the same as with a conventional disk harrow; for example, compaction of the soil by the tractor is still a problem, a tractor is needed and it still requires that field conditions be ideal before such apparatus can be used effectively to prepare a seed bed.

SUMMARY OF THE INVENTION

The present invention relates to a self-propelled disk harrow which has an engine for driving the discs themselves so as to simultaneously till the soil and also propel the disk harrow along the ground. The engine is also utilized to selectively rotate wheels. The disc members themselves are exposed below the wheels so that the wheels normally function as a depth gauge for the disc members in engagement with the ground when the disk harrow is in operation, but if the disc members extend too far into the ground the weight of the disk harrow transfers to the wheels to allow them to also propel the disk harrow, to drive the disk harrow in addition to the driving force on the discs.

An object of the present invention is to provide an improved disk harrow apparatus.

Another object of the invention is to provide a self-propelled disk harrow which is practical to use and economical to construct.

A further object of the invention is to provide a disk harrow which allows tillage of the soil sooner than if a tractor drawn disk harrow were to be used.

Still another object of the invention is to provide a disk harrow which has good fuel economy as compared to the tractor drawn disk harrows.

Still a further object of the invention is to provide a disk harrow which can also be converted to a roller to break the crust on the top of the ground to thereby let the crop get through such crust.

Other objects, advantages, and novel features of the present invention will become apparent from the following detailed description of the invention when considered in conjunction with the accompanying drawings.

DESCRIPTION OF THE PREFERRED EMBODIMENT

Figure 1:
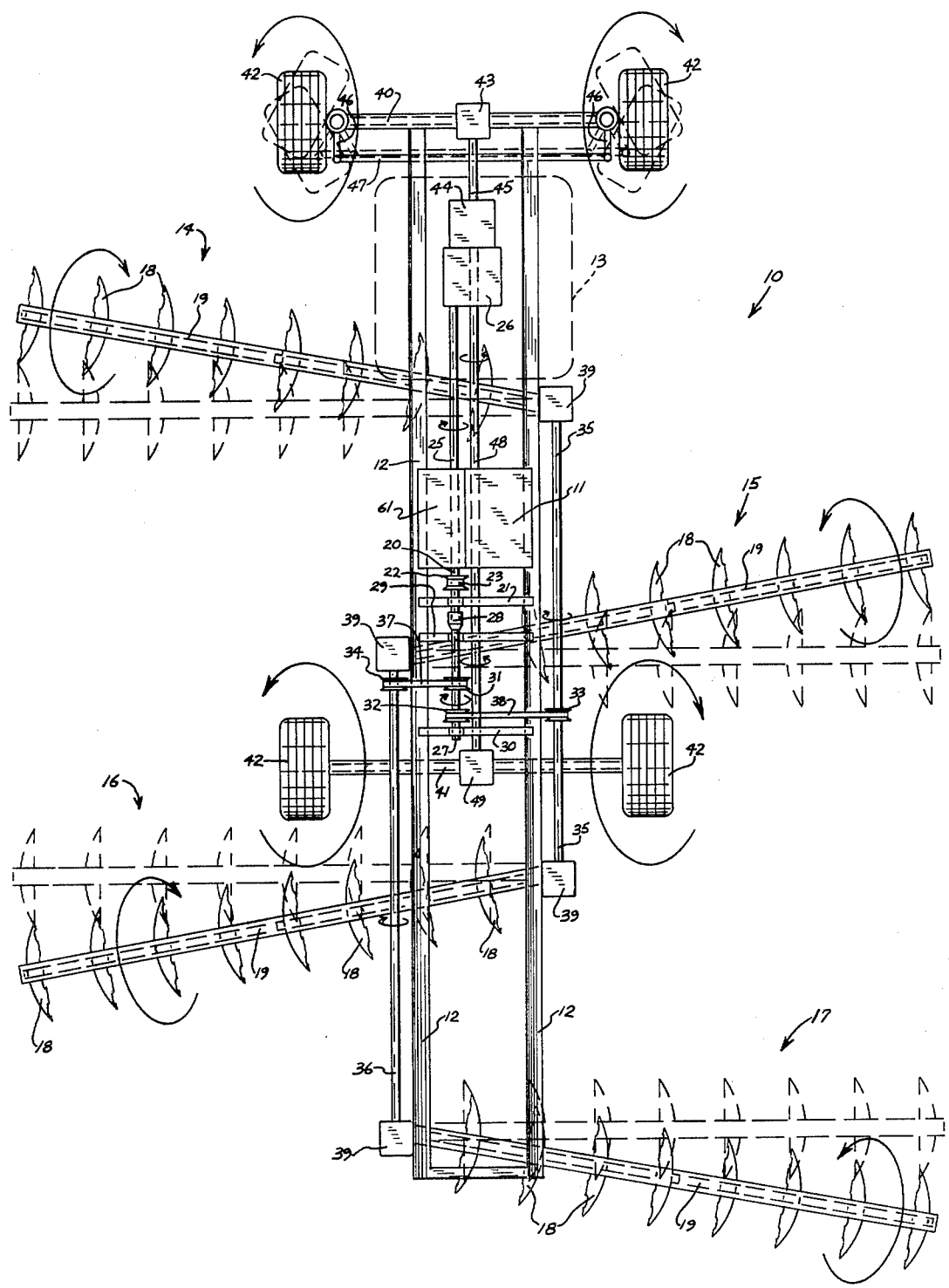
FIG. 1 is a plan view of a preferred embodiment of the present invention.

Referring now to the drawings wherein like reference numerals designate identical or corresponding parts throughout the several views, FIG. 1 shows a disk harrow apparatus 10 constructed in accordance with the present invention. An internal combustion engine 11 is shown mounted to a frame 12. The frame 12 extends along the length of the disk harrow 10 and includes a cab 13 at the forward end thereof for housing the controls and for providing a place for the operator to be. A first, second, third and fourth set of disc gangs 14, 15, 16 and 17 respectively are operably mounted to the frame 12 and are selectively movable from the position shown in solid lines in FIG. 1 to the position shown in dashed lines in FIG. 1.

A driving train apparatus is provided for utilizing the engine 11 to selectively rotate the discs 18, which are on the shafts 19 of the gangs 14–17. The engine 11 includes an output shaft 20 supported by a mounting bracket 21 including bearing devices, not shown. A transmission 61 is optionally interposed in the connection between the engine 11 and the output shaft 20 in order to be able to more readily control the speed and power transmitted to the output shaft 20. The output shaft 20 includes a variable speed pulley 22 which has a belt 23 therearound. This belt 23 also goes around a variable speed pulley 24 shown in FIG. 2, which pulley 24 is affixed to a shaft 25. This shaft 25 is rotatably mounted within the member 21 by a bearing, not shown, and this shaft 25 extends back to a 4-speed transmission 26.

The output shaft 20 also turns a secondary output shaft 27 through a coupler member 28. This shaft 27 is operably and rotatably mounted to the frame 12 by means of members 29 and 30, which include bearings and are rigidly affixed to the frame 12. Variable speed pulleys 31 and 32 are rigidly attached to the shaft 27.

Variable speed pulleys 33 and 34 are rigidly attached to drive shafts 35 and 36. A belt 37 joins the pulleys 31 and 34 and a pulley belt 38 operably connects the pulleys 32 and 33 together. Consequently, when the engine 11 is turning the output shaft 20, then this rotation can be transmitted to the shafts 35 and 36 through the above mentioned pulley and belt arrangement. The rotational speed of the shafts 35 and 36 can be adjusted by use of the variable speed pulleys mentioned above.

Right angle gear boxes 39 are positioned at each end of each of the shafts 35 and 36, and these right angle gear boxes 39 transfer the rotary motion from the shafts 35 and 36 to the shafts 19 of each of the disc gangs 14-17. It is to be understood that the disc members 18 are rigidly attached to the shaft 19. It is also to be understood that this shaft 19 may include a hinging arrangement for allowing it to fold for more readily traveling on public roads, for example as shown in dashed lines in FIG. 2.

Also attached to the frame 12 are a pair of axles 40 and 41. These axle structures allow wheels 42 to be rotatably mounted on the disk harrow apparatus 10. A right angle gear box 43 is disposed at the extreme front of the disk harrow 10 for transmitting rotational power from the engine 11, through the transmission 26 and through a transfer case 44 and shaft 45 to the axle 40 and thereby to the front wheels 42. Steering structures including levers 46 and tie rod 47 are utilized in a conventional manner to provide steering for such disk harrow 10. Alternatively a steering structure as used in farm wagons can be used. A shaft 48 extends rearwardly from the transfer case 44 and is rotated at the same speed as the shaft 45. This shaft 48 extends rearwardly to a right angle gearbox 49 which is utilized to transfer the rotational power from the shaft 48 to the axles 41, thereby rotating the rear wheels 42. The rotational speed of the wheels 42 are adjusted to utilizing the 4-speed transmission 26 and the variable speed pulleys 22 and 24.

Figure 2:
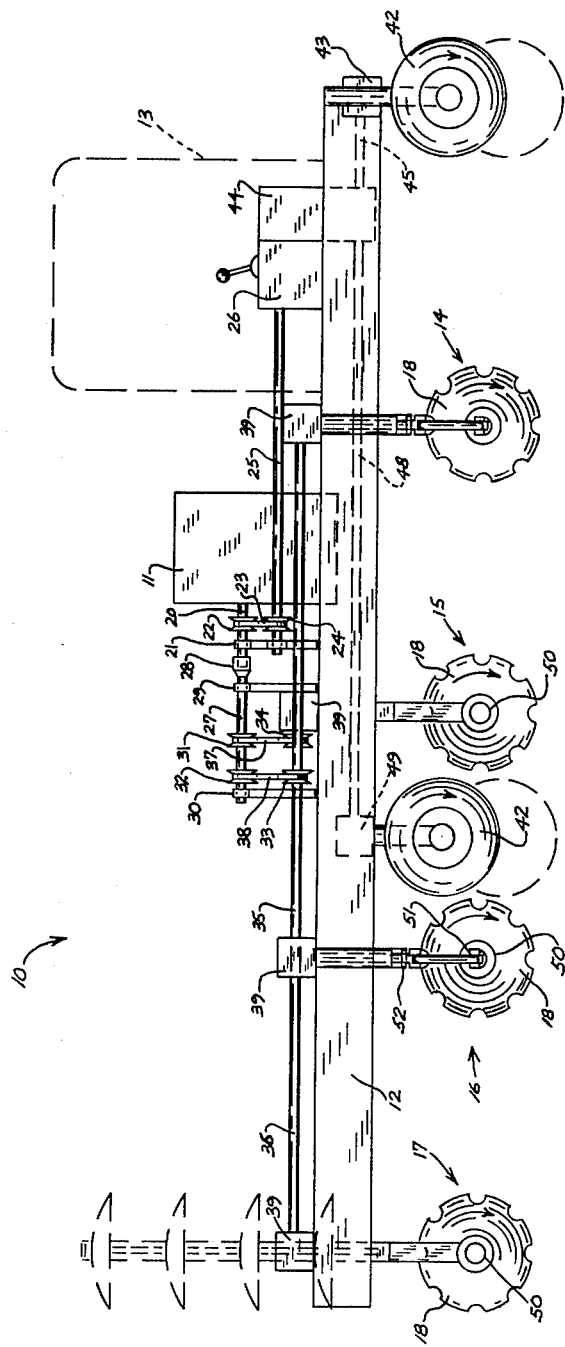
FIG. 2 is a side elevational view of the preferred embodiment shown in FIG. 1.

Referring to FIG. 2 it is noted that the member 50 can be a right angle gear box; or alternatively, a pair of universal joint members 51 and 52 can be utilized to transmit the rotary power down from the right angle gear box 39. Other structures for performing this function are also acceptable.

Notches 53 in the disc 18 tend to aid in allowing the disc members 18 to propel the disk harrow 10 without aid from the wheels 42.

In operation, the wheels 42 would be moved to the position shown in dashed lines in FIG. 2 and then driven over public roads to the place where it is to be utilized. Once the disk harrow 10 is in the field, then the wheels 42 would be moved from the position shown in dashed lines in FIG. 2 to the position shown in solid lines in FIG. 2. At that point, the discs 18 extend downwardly below the bottom of the wheels 42 and the wheels 42 serve as gauge wheels to prevent the disc members 18 from going too far into the ground. The depth that the disc members 18 extend into the ground can be adjusted by adjusting the vertical position of the wheels 42. The rotational speed of the discs 18 and the wheels 42 are adjusted to be at approximately the same speed, but the preferable condition would be that the speed of the disc members 18 would be rotating very slightly faster than the speed of the wheels 42. The disk harrow 10 would then be utilized to till the soil.

If it should happen that the disc members 18 go into the ground too far due to such things as wet soil or very sandy soil, more of the weight of the disk harrow 10 would transfer to the wheels 42 to prevent the members 18 from going down further. At that time, the wheels, which are already rotating, will then tend to help propel the disk harrow 10 along and insure that such machine does not become stuck in the soil.

Under certain conditions it may be desirable to use the apparatus 10 described above as a roller. For example, when seeds have been planted and then it rains and then dries, in some soils a crust forms over the top of the soil which is almost impenetrable by the growing seed. If this crust is not broken, the plants cannot survive. In such a case, this apparatus 10 is used with the gangs 14-17 in the position shown in dashed lines in FIG. 1 so that all of the gangs 14-17 are parallel. In such a case the crust on the ground is merely broken without significant disturbance to the seed bed, rather than throwing dirt to one side which is done by each disc member when the gangs 14-17 are disposed as shown in solid lines in FIG. 1.

Consequently, it can be seen that there is very little if any compaction as compared with the large compaction factor when large tractors are used to propel disk harrow devices. It is also clear that the other objects referred to above are clearly met. Obviously many modifications and variations of the present invention are possible in light of the above teachings. It is therefore to be understood that, within the scope of the appended claims, the invention may be practiced otherwise than as specifically described.

I claim:

1. A self-propelled disk harrow comprising:
   a frame;
   a plurality of wheels rotatably attached to said frame, the forwardmost of said wheels being spaced longitudinally from the rearwardmost of said wheels by at least one-half the operable length of the frame;
   means rotatably mounting a plurality of ground engaging disc members to said frame for causing said disc members to carry substantially all of the weight of said disk harrow during normal tilling operations, said disc members extending a substantial distance below said wheels when said disk harrow is in a ground tilling position;
   means operatively attached to said frame for rotating said disc members to thereby propel said disk harrow and till the ground;
   means operatively attached to said frame for rotating all of said wheels at substantially the same speed as the rotational speed of said disc members whereby if said disc members extend into the ground more than said substantial distance, a substantial amount of the weight of the disk harrow will transfer to said wheels to help propel the disk harrow and prevent it from becoming stuck.

2. The self-propelled disk harrow of claim 1 wherein said disc members are disposed on first, second, third and fourth axles, said axles being disposed on different axes with respect to each other.

3. The self-propelled disk harrow of claim 2 wherein said second axle is disposed behind said first axle, said third axle is disposed behind said second axle and said fourth axle is disposed behind said third axle.

4. The self-propelled disk harrow of claim 3 wherein the axes of said first and fourth axles are substantially parallel.

5. The self-propelled disk harrow of claim 4 wherein the axes of said second and third axles are substantially parallel.

6. The self-propelled disk harrow of claim 5 wherein said frame includes a longitudinal centerline, the major portion of said first and third axles extending to one side of said centerline and the major portion of said second and fourth axles extending on the other side of said centerline.

7. The self-propelled disk harrow of claim 6 including means for varying the axes of said axles with respect to said centerline whereby said disk harrow can be used as a roller to break a crust on the ground by moving said axles into a position whereby all axles are parallel.

8. The self-propelled disk harrow of claim 1 including means for moving said wheels downwardly beyond the bottom of said disc members whereby said disk harrow may travel on public roads without damaging the roads.

* * * * *